Aug. 20, 1929.  A. I. FISCHER  1,724,920
PIPE BEADING TOOL
Filed Aug. 23, 1926  2 Sheets-Sheet 1

Inventor
ARTHUR I. FISCHER

Aug. 20, 1929. A. I. FISCHER 1,724,920
PIPE BEADING TOOL
Filed Aug. 23, 1926 2 Sheets-Sheet 2
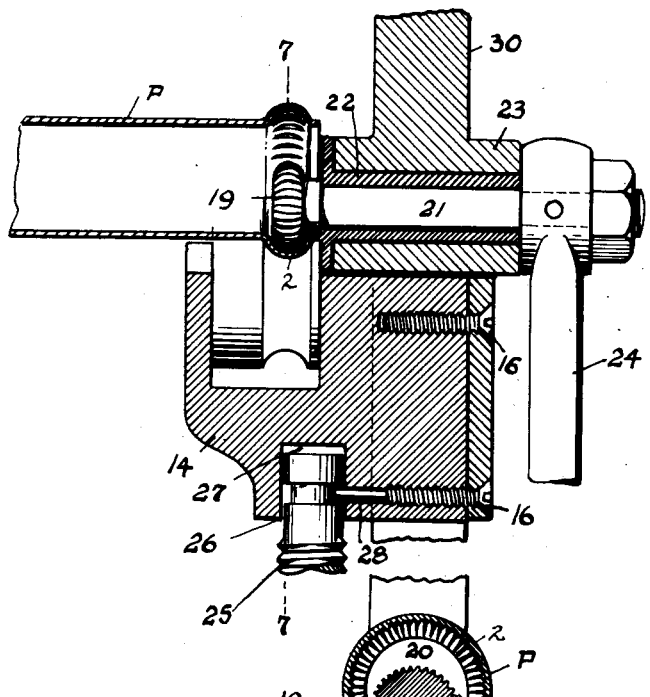
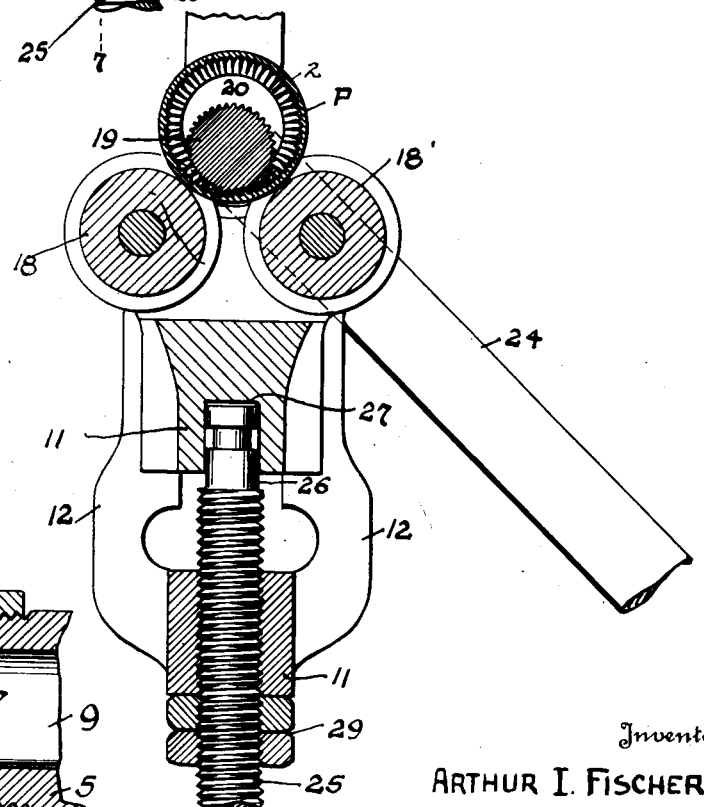
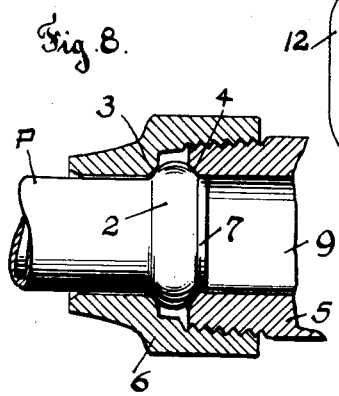
Inventor
ARTHUR I. FISCHER Patented Aug. 20, 1929.

1,724,920

UNITED STATES PATENT OFFICE.

ARTHUR I. FISCHER, OF CLEVELAND, OHIO, ASSIGNOR TO MORRIS H. GLAUBER, OF CLEVELAND, OHIO.

PIPE-BEADING TOOL.

Application filed August 23, 1926. Serial No. 130,850.

My present invention relates to a pipe beading tool, and my object in general is to provide a simple device adapted to apply a rolling pressure to one end of a metal pipe to produce an annular bead in the pipe preliminary to making a coupling connection for the pipe. Thus in installing water distributing pipes an increasing practice is to use copper and brass pipes, both underground and in erecting buildings, and obviously such pipes must be coupled to each other and to valves, cocks, etc., with durable water-tight sealing connections. To facilitate the making of such connections without screw-threads and pipe-threading operations, I have devised the coupling connection shown and described in my companion application filed on even date herewith, Serial No. 130,849, and to expedite and promote the beading of the pipes for coupling connections of that kind, either prior to or during installation of such pipes, I have devised the present powerful hand tool which is small and compact and may be used readily on the bench or on pipes already installed, including pipes in trenches.

Figure 1:
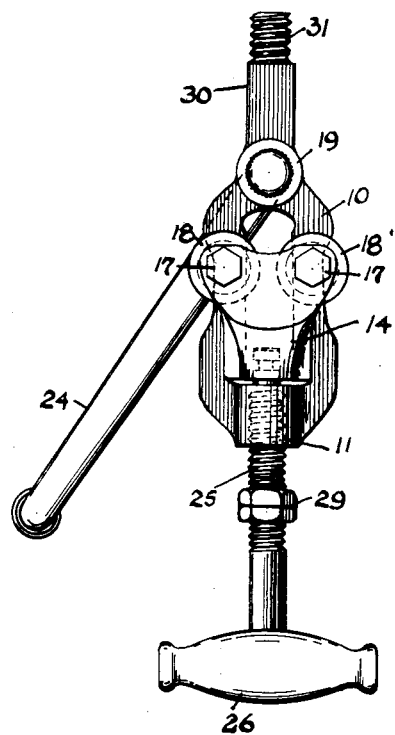
Figure 2:
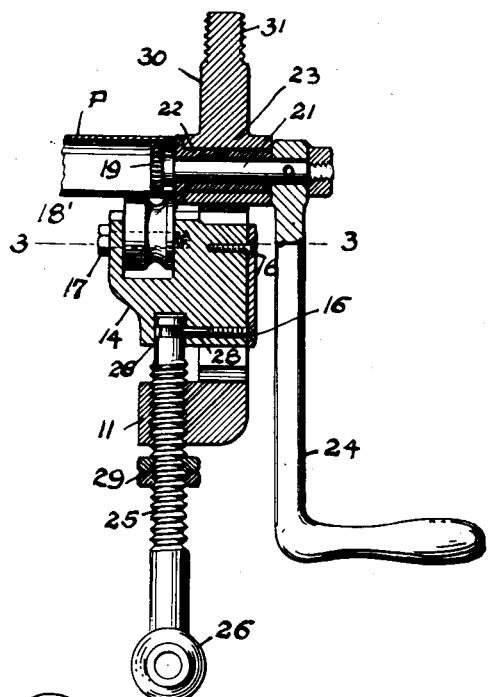
Figures 4, 5:
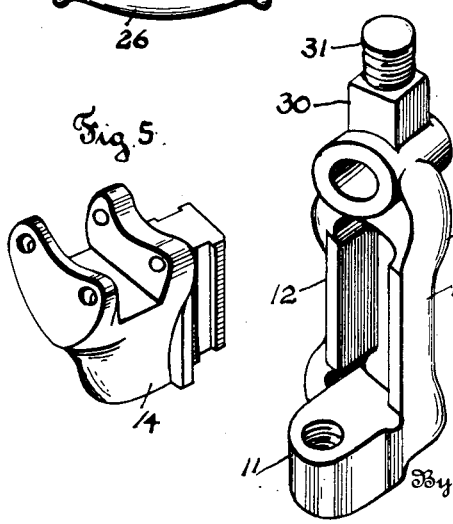
Figure 3:
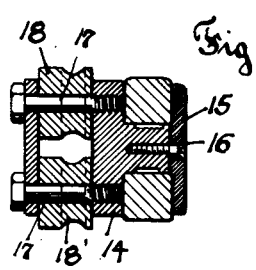

In the accompanying drawings, Fig. 1 is a front view, on a reduced scale, of my improved pipe beading tool, and Fig. 2 is a sectional view vertically thereof showing a piece of straight pipe therein before beading takes place. Fig. 3 is a cross section of the device on line 3—3 of Fig. 2. Fig. 4 is a perspective view of the main body with the sliding head and other operating parts removed therefrom, and Fig. 5 is a perspective view of the sliding head itself. Fig. 6 is an enlarged sectional view of the central part of the device showing a pipe therein with a completed head, and Fig. 7 is a sectional view of the same parts and a cross section of the beaded portion of the pipe on line 7—7 of Fig. 6. Fig. 8 is a side elevation of a beaded pipe and a sectional view of a pair of coupling members clamping the beaded portion of the pipe therebetween.

Thus, referring to Fig. 8, the piece of pipe P shown therein may be composed of ductile metal, such as copper or brass, having an annular bead 2 formed therein, which bead is smoothly rounded or partly spherical exteriorly to permit it to seat with sealing effect against a pair of opposed clamping seats 3 and 4, respectively, within a coupling member 5 and a tubular coupling nut or sleeve 6 having screw-connection with said member. Bead 2 may be formed in the body of the pipe more or less distant from the end of the pipe, and as shown a short straight extension 7 beyond bead 2 is present to enter the main bore or water passage 8 in coupling member 5.

Now, referring to the remaining figures showing the tool for producing bead 2 in pipe P, the body 10 of the tool is of skeleton pattern comprising a foot portion 11 extending laterally from a pair of spaced legs 12—12 having flat straight-edged guide ways at their inner sides between which a sliding head 14 is confined and held by means of a separate steel plate 15 secured removably upon the rear face of head 14 by screws 16. The upper part of head 14 is flanged and channeled at its front and carries two parallel bolts or shafts 17—17 upon which a pair of grooved rollers 18—18' are rotatably mounted between which the end of the piece of pipe P may be centrally seated. A third roller 19, having a transversely rounded circumference which is serrated or provided with sharp teeth 20, is fastened to or forms an integral part of a shaft 21 having rotatable bearing in a flanged bushing 22 extending through the upper part or yoke portion 23 of body 10, the axis of roller 19 and its shaft being in a vertical plane centrally between the two lower rollers 18—18', and the width or thickness of roller 19 being somewhat less than the width of the round grooves in said lower rollers. A crank handle 24 is secured to the rear projecting end of shaft 21 to permit roller 19 to be rotated by hand when the end of pipe P is inserted between all three rollers with the toothed roller 19 located within the pipe and engaged with the inner circular wall thereof opposite rollers 18—18'. In this relationship of the parts serrated roller 19 and the pair of rollers 18—18' may be gradually fed toward each other by a pressure-applying screw 25 having a handle 26 at its lower end which may be grasped and turned by one hand while crank handle 24 is being rotated by the other hand of the operator. Thus pressure screw 25 extends through foot portion 11 of body 10 and has a grooved upper extremity 26 extending into a round socket 27 in the bottom of sliding head 14 where a short pin 28 is adapted to extend into the annular groove in said extremity to lock the screw in rotatable connection with said head. Pin 28 is a separate element which is inserted in advance of one of the screws 16 which fastens plate 15 to head 14, and this pin cannot be removed unless said screw is first removed. A pair of stop and lock nuts 29 are sleeved adjustably on screw 25 to limit the upward movement of slide head 14 and the grooved rollers thereon in respect to the toothed beading roller 19. The diameter of the bead on the pipe may thus be regulated or changed and excessive expansion or rupture of the pipe prevented. At the beginning of operations when pressure screw 25 is turned to clamp the pipe between the three rollers the sharp teeth in roller 19 embed themselves in the inner wall of the pipe and the wall is pressed outward to conform to the round shape of this roller. Then as crank handle 24 is turned roller 19 forcibly turns the pipe on its axis, or the tool itself may be caused to rotate on the axis of the roller, thereby producing a partially developed bead in the pipe and a circle of corrugations in the inner surface of the bead. Continued feeding of head 14 by pressure screw 25 gradually enlarges the bead until the bead is fully developed, the limit of feeding movement being predetermined by the position of stop nut 29 on the screw.

Body 10 in the present tool is provided at its top with a square lug 30 to permit this part of the device to be gripped in a vise, providing conditions require a stable or stationary mounting of the tool in a vise. A screw-threaded extension 31 at the top of lug 30 may also be used to secure the device in a screw-threaded opening, or to permit a lever to be secured to body 2 if rotation of the body is desired.

What I claim, is:

1. A pipe beading tool, comprising a main body member and a roller mounted thereon having a serrated circumference, a movable head and a pair of rollers thereon slightly spaced from each other and mounted opposite and symmetrically to said serrated roller, means adapted to shift said head and apply pressure to a pipe inserted between said rollers, and means adapted to impart a rotary movement to one of the parts carrying said rollers.

2. A pipe beading tool, comprising a body member having a guide-way therein, a head slidably mounted within said guide-way having a pair of grooved rollers mounted thereon, a feed and pressure applying screw supported upon said body having swivel connection with said head, a roller having a rounded and serrated circumference mounted upon said body member midway opposite said grooved rollers, and means for rotating said serrated roller.

3. A pipe beading tool, comprising a body having guides and a head slidably secured to said guides, a serrated roller mounted opposite said head, a pair of rollers having round grooves annularly therein disposed on said head opposite said serrated roller and rotatable in the same plane as said roller, a feed and pressure screw for said head and an adjustable stop therefor, and means for rotating said serrated roller.

4. A pipe beading tool, comprising a body having an opening lengthwise thereof and guides oppositely of said opening and formed with a square outer end having a screw-threaded extension, the opposite end of said body having a foot portion formed with a screw-threaded opening, a shaft journaled within said body having a serrated roller at one end and a crank handle at its opposite end, a head slidably supported within said opening between said guides, grooved rollers mounted upon said head spaced apart from each other and symmetrically arranged opposite said serrated roller, and a feed and pressure applying screw extending through said opening in said foot portion and having swivel connection at one end with said head and having a handle at its opposite end.

In testimony whereof I affix my signature.

ARTHUR I. FISCHER.